Inventor:
Fred D. Fowler,
by Charles S. Gooding,
Atty.

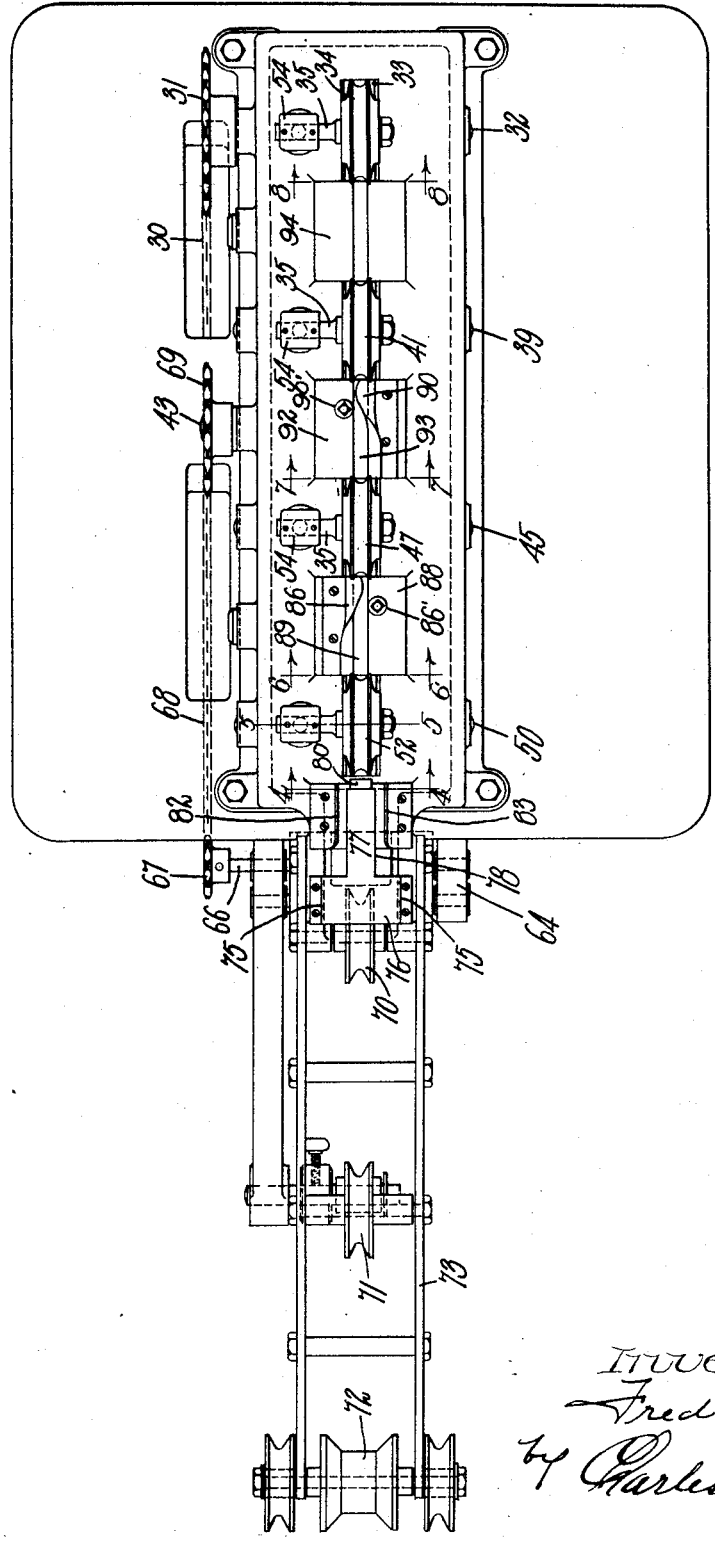

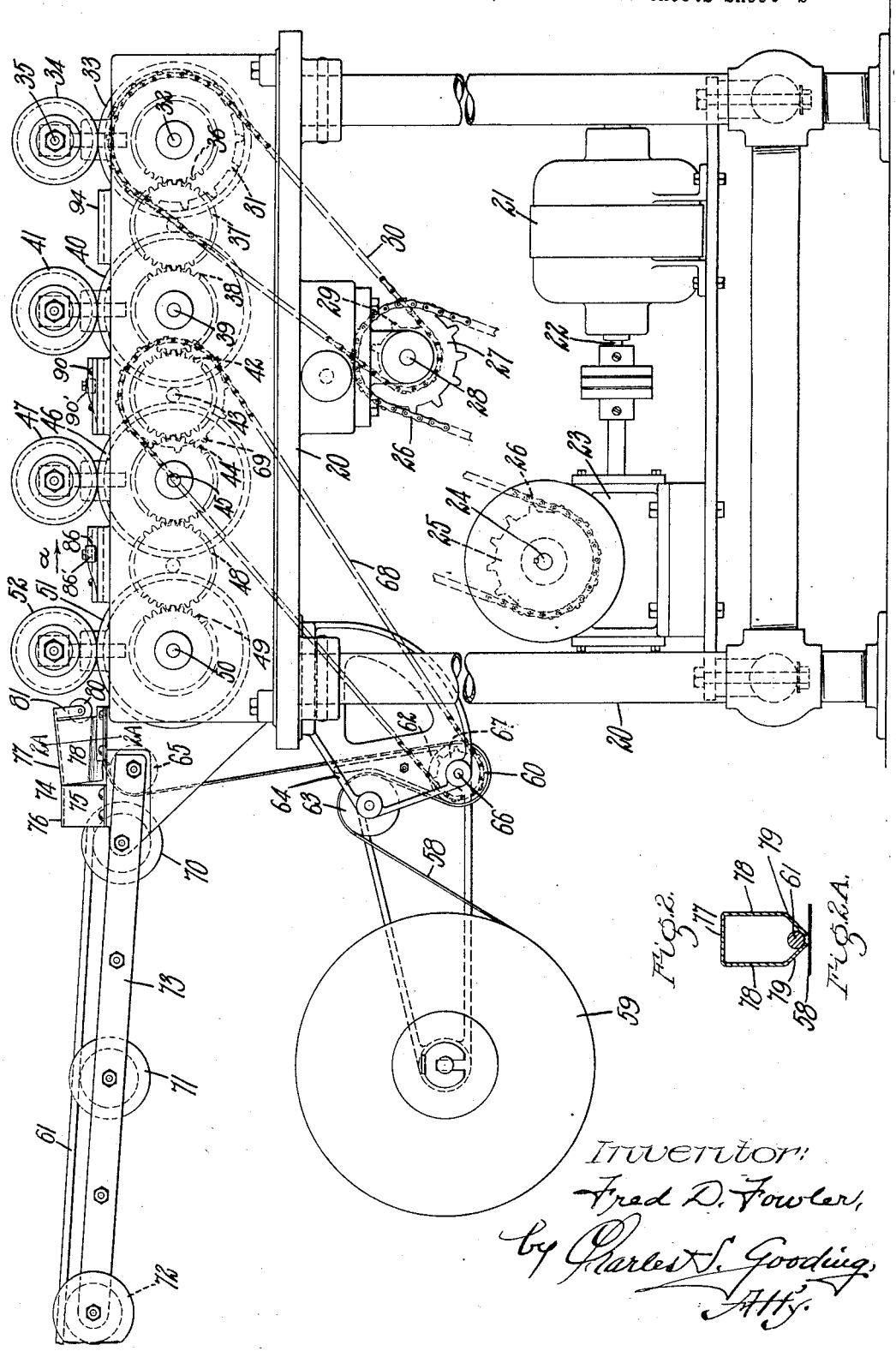

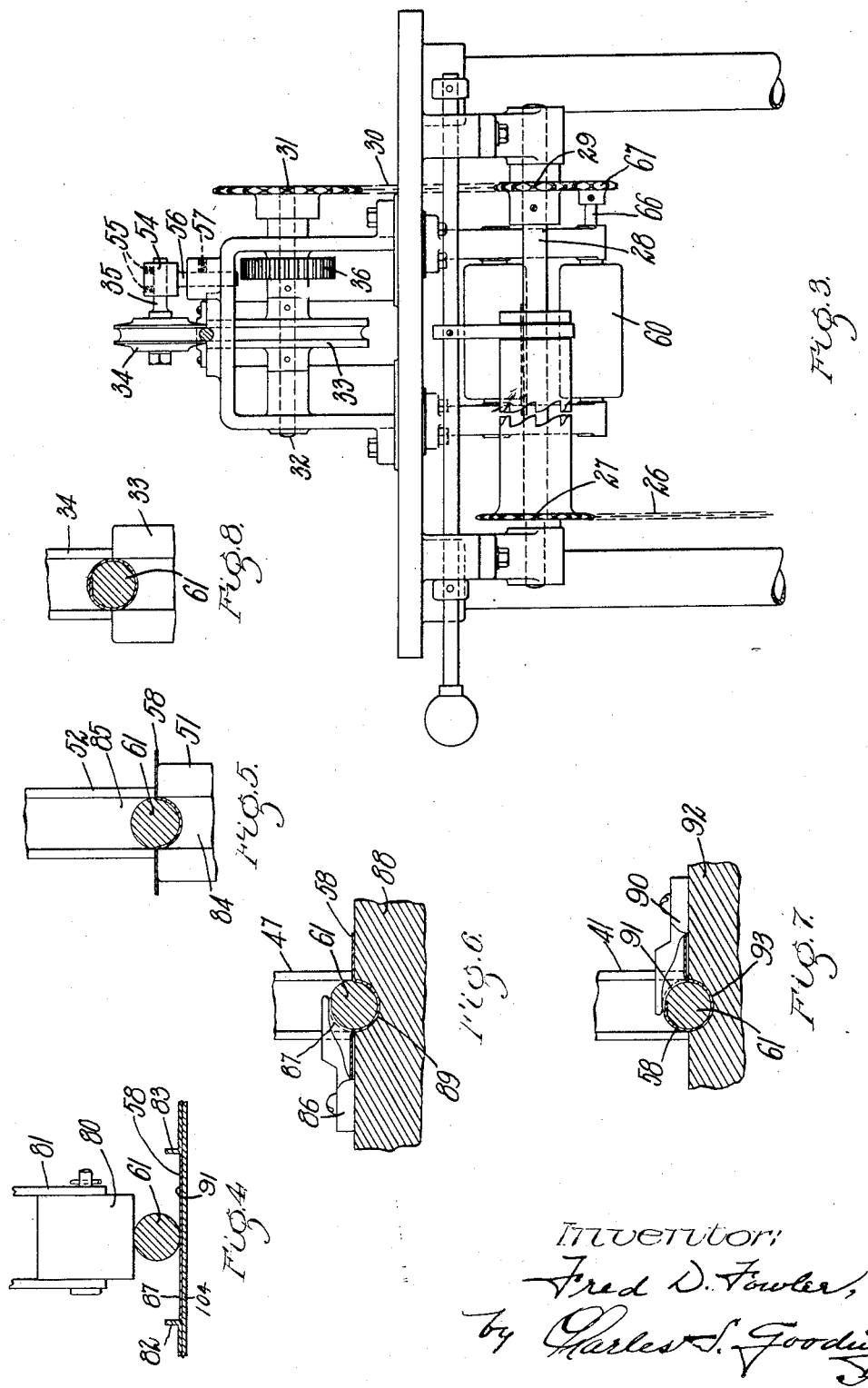

Patented Oct. 27, 1931

1,829,041

UNITED STATES PATENT OFFICE

FRED D. FOWLER, OF NEWTON, MASSACHUSETTS, ASSIGNOR, BY MESNE ASSIGNMENTS, TO HOOD RUBBER COMPANY, INC., OF WILMINGTON, DELAWARE, A CORPORATION OF DELAWARE

TIRE BEAD COVERING MACHINE

Application filed January 7, 1928. Serial No. 245,124.

This invention relates to a machine for covering a core of rubber compound with rubberized fabric to form a bead for automobile tires.

The invention consists in mechanism for feeding a strip of fabric and a core of rubber compound superimposed thereon, and in folding the opposite sides of the strip of fabric around the core.

The invention further consists in the mechanisms and means hereinafter set forth in the specification and in the combination of elements set forth in the different claims hereunto appended.

In the machine of this invention a core of rubber compound is fed into the machine and a strip of rubberized fabric is also fed into the machine and the two are so guided as to cause the core to be superimposed upon the strip of fabric midway between its edges and pressed thereagainst; then one side of the fabric is folded by a stationary folder of peculiar form over the core. The fabric and core are then fed between another pair of rolls which not only perform a feeding operation but press the fabric, which has been folded, over the core into close contact therewith. The next step in the operation is to fold the other side of the strip of fabric over the core, and following that step in the operation, a third pair of feed rolls feeds the strip of fabric, now entirely encircling the core, forward, and simultaneously presses the folded portion of the fabric into close contact with the core. Another pair of feed rolls operates to feed the completely covered bead forward and out of the machine.

Referring to the drawings:—

Figure 1 is a plan view of my improved bead covering machine.

Fig. 2 is a front elevation of the same, broken away.

Fig. 2A is a detail section on line 2A—2A, Fig. 2.

Fig. 3 is an end elevation of the machine as viewed from the right of Fig. 2, the same being partly broken away and two of the legs of the machine omitted for the sake of clearness.

Fig. 4 is a detail sectional elevation taken on line 4—4, Fig. 1.

Fig. 5 is a detail sectional elevation taken on line 5—5, Fig. 1.

Fig. 6 is a detail sectional elevation taken on line 6—6, Fig. 1.

Fig. 7 is a detail sectional elevation taken on line 7—7, Fig. 1.

Fig. 8 is a detail sectional elevation taken on line 8—8, Fig. 1.

Like numerals refer to like parts throughout the several views of the drawings.

Figure 9:
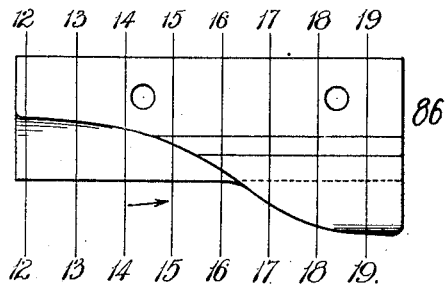
Fig. 9 is a plan view of one of the fabric strip folders.

In the drawings, 20 is the frame of the machine. 21 is an electric motor, the shaft 22 of which is connected to a speed-reducing mechanism 23. 24 is a driven shaft of the speed-reducing mechanism, to which is fastened a sprocket gear 25 connected by a sprocket chain 26 to another sprocket gear 27. The sprocket gear 27 is fast to a shaft 28 to which a sprocket gear 29 is fastened, which is connected by a sprocket chain 30 to another sprocket gear 31. The sprocket gear 31 is fastened to a shaft 32 which has a feed roll 33 fastened thereto. The feed roll 33 has a grooved periphery to receive the core and its fabric covering. Another feed roll 34 is rotatably mounted upon a stud 35 and is positioned above the feed roll 33, said feed roll 34 also having a grooved periphery.

The shaft 32 has a gear 36 fast thereto which meshes into an intermediate gear 37 rotatably mounted on the frame, the gear 37 meshing into a gear 38 which is fastened to a shaft 39. The shaft 39 has a feed roll 40 fast thereto which coacts with another feed roll 41 positioned thereabove, both of these feed rolls having grooved peripheries.

The gear 38 meshes into a gear 42 fast to a shaft 43 rotatably mounted upon the frame of the machine, said gear meshing into a gear 44 which is fast to a shaft 45 having a feed roll 46 fast thereto and coacting with a feed roll 47. The gear 44 meshes into an intermediate gear 48, which meshes into a gear 49 fast to a shaft 50, to which a feed roll 51 is fastened, the feed roll 51 coacting with a feed roll 52 positioned thereabove.

The feed rolls are, therefore, arranged in pairs, namely, 33 and 34, 40 and 41, 46 and 47, and 51 and 52. As will be seen by reference to Fig. 3, the feed roll 34, and the same is true of the feed rolls 41, 47 and 52, is rotatably mounted upon a stud 35 which is clamped to a support 54 by screws 55.

The support 54 has a vertical shank 56 extending downwardly therefrom which is adjustable vertically on the frame of the machine and is locked in position by a screw 57, so that the upper feed rolls, each of them, can be adjusted vertically or horizontally to position them at the right distance from the lower feed rolls to grip the bead, and by the horizontal adjustment these upper feed rolls can be positioned to align with the lower feed rolls.

The mechanism for feeding the strip of rubberized fabric 58 into the machine is the subject-matter of United States Patent No. 1,716,375, entitled "Feed mechanism for sheet material".

The fabric strip 58 is a rubberized fabric and there is considerable tension applied to the fabric, which is wound upon a supply roll 59, due to the tackiness of the stock when the fabric is drawn from the supply roll, and this tension tends to stretch and narrow the strip, thus distorting it, especially is this the case where the textile fabric is cut on a bias. In order to overcome this difficulty, the fabric is fed between the feed rolls 51 and 52, and between said feed rolls and the supply roll there is interposed an auxiliary feed roll 60, the surface speed of which is greater than the surface speed of the pair of feed rolls 51 and 52, between which the strip of fabric and a rubber compound core 61, forming the bead, are fed. The auxiliary feed roll 60 is positioned with its bottom surface below a plane tangential to the pair of feed rolls, and when the feed rolls have taken up enough of the fabric to cause the same to engage the under surface of the auxiliary feed roll, as illustrated in Fig. 2, this auxiliary feed roll, which is rotated with a surface speed greater than the surface speed of the feed rolls, will pull a certain amount of the fabric from the supply roll 59, whereupon the fabric will drop below the auxiliary feed roll and the pair of feed rolls 51 and 52 will then only need to pull the fabric with tension sufficient to lift the fabric until it again comes into contact with the auxiliary feed roll.

With very tacky material there is a tendency for the rubberized fabric to follow around with the auxiliary roll at certain times, and this is overcome by means of a doctor 62 which contacts with the periphery of the auxiliary feed roll as shown in Fig. 2.

The strip of fabric 58 passes from the supply roll 59 around an idler roll 63 rotatably mounted upon a bracket 64 fast to the frame of the machine. Thence the strip of fabric passes downwardly around the underside of the auxiliary feed roll, and from the auxiliary feed roll it passes upwardly over an idler roll 65 rotatably mounted upon the frame of the machine, and thence over a plate 104 to the feed rolls 51 and 52.

The auxiliary feed roll 60 is fastened to a shaft 66, to the rear end of which, see Fig. 1, is fastened a sprocket gear 67 which is connected by a sprocket chain 68 to a sprocket gear 69 fast to the shaft 43, which is driven by the gear 42.

The rubber compound core 61 is also fed into the machine by the feed rolls 51 and 52 and passes thereinto over the guide rolls 70, 71 and 72 which are rotatably mounted upon an auxiliary frame 73 fast to the frame of the machine. The core 61 passes from the guide roll 70 into a guide frame 74 which consists of side plates 75 connected together by a top 76, and this guide frame is fastened to the frame of the machine.

The top 76 is narrowed to form an extension 77, see Figs. 1 and 2, and extending downwardly from this extension 77 are side plates 78 which are oppositely disposed and which converge downwardly toward their bottom edges at 79, so that as the core 61 is fed through this guide frame, it is positioned by the converging plates 79, forming the lower portion of the side plates of the extension 77 and constituting a trough having downwardly converging inner faces, midway between the edges of the strip of fabric 58, with which it is pressed into contact by an idler roll 80 supported upon ears 81 extending downwardly from the top plate extension 77. It will be seen that the top plate extension 77 is only connected to the top 76 by its width and, therefore, being of spring metal, it forms a yielding support for the idler roll 80 which, therefore, presses the core 61 against the fabric with a yielding pressure as illustrated in enlarged detail in Fig. 4.

The strip of fabric 58 at this point is positioned laterally by guide plates 82 and 83 which bear against its opposite edges. The core 61 now being superimposed upon the strip of fabric 58 and pressed thereagainst is drawn along in the direction of the arrow *a*, Fig. 2 by the feed rolls 51 and 52, as illustrated in Fig. 5, where it will be seen that the core 61 is gripped between the feed rolls 51 and 52, and as the peripheries of these feed rolls are grooved the fabric 58 is pressed downwardly into the groove 84 of the feed roll 51, as illustrated in Fig. 5, while the upper portion of the core is positioned in the groove 85 of the upper feed roll 52.

From the feed rolls 51 and 52 the fabric and the core are drawn in the direction of the arrow *a* by the feed rolls 46 and 47 and through a folder 86, and a side 87 of the fabric strip is folded up over the core 61 by this folder as illustrated in Fig. 6. The folder 86 is fastened to a guide 88, as illustrated in Fig. 6, this guide being provided with a semicircular groove 89 in which the core and the strip of fabric are partially imbedded.

The strip of fabric and the core pass from the folder 86 between the rolls 46 and 47 to another folder 90, which is in every respect similar to the folder 86 except that one is a right and the other is a left hand folder. The folder 90 causes a side 91 to be folded around the upper portion of the core 61, as illustrated in Fig. 7, and thus the core is now surrounded by the strip of fabric. The folder 90 is also fastened to a guide 92 which is provided with a groove 93 to partially receive the strip of fabric and the core, all as illustrated in Fig. 7.

From the folder 90 the bead, consisting of the core and strip of fabric surrounding the same, is fed in the direction of the arrow *a* by the feed rolls 40 and 41 which press the fabric into close contact with the core. The bead passes from the feed rolls 40 and 41 along a guide 94 to the feed rolls 33 and 34, and the fabric is still further closely pressed into contact with the core by these rolls as illustrated in Fig. 8. The bead is now completed and passes from the machine and is cut into lengths which are joined together to form rings, in a manner well known to those skilled in the art.

The folder 86, by which one side of the fabric is folded over the core, is illustrated in detail in Figs. 9 to 19 inclusive.

Figure 11:
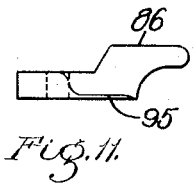
Fig. 11 is an end elevation of the folder plate as viewed from the left of Fig. 9.
Figure 10:
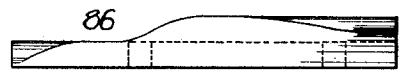
Fig. 10 is a front elevation of the same.
Figure 12:
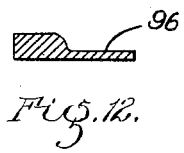
Fig. 12 is a detail section taken on line 12—12, Fig. 9.
Figure 13:
Fig. 13 is a detail section taken on line 13—13, Fig. 9.
Figure 14:
Fig. 14 is a detail section taken on line 14—14, Fig. 9.
Figure 15:
Fig. 15 is a detail section taken on line 15—15, Fig. 9.
Figure 16:
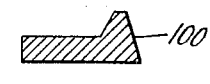
Fig. 16 is a detail section taken on line 16—16, Fig. 9.
Figure 17:
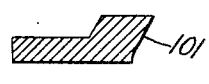
Fig. 17 is a detail section taken on line 17—17, Fig. 9.
Figure 18:
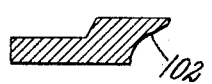
Fig. 18 is a detail section taken on line 18—18, Fig. 9.
Figure 19:
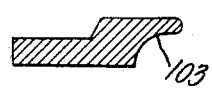
Fig. 19 is a detail section taken on line 19—19, Fig. 9.

It will be seen by reference to Fig. 11 that the side 87 first engages a thin edge 95 of the folder 86. As the fabric is fed forward in the direction of the arrow, Fig. 9, it engages different portions of the contacting surfaces 96, 97, 98, 99, 100, 101, 102 and 103. Thus it will be seen that the side 87 of the strip of fabric is lifted gradually from the position occupied by it when it first engages the edge 95 of the folder 86, so that it is gradually lifted and folded over the core and is then pressed against the core and into close contact therewith by the feed rolls 46 and 47. The same operation takes place with relation to the other side 91 of the strip of fabric when it encounters the folder 90, the feed rolls 46 and 47, 40 and 41, 33 and 34 acting not only to feed the bead but to press the folded portions of the fabric strip firmly into contact with the core of the bead. The bead is held in engagement with the folders 86 and 90 by guide rolls 86' and 90' respectively.

I claim:

1. A tire bead covering machine having, in combination, means for feeding a strip of fabric and a core of rubber compound superimposed thereon comprising a pair of feed rolls, means to guide the core to said strip of fabric, an auxiliary feed roll positioned in advance of said pair of feed rolls, means to guide said strip of fabric to said auxiliary feed roll, and means to rotate said auxiliary feed roll at a greater surface speed than that of said pair of feed rolls.

2. A tire bead covering machine having, in combination, means for feeding a strip of fabric and a core of rubber compound superimposed thereon comprising a pair of feed rolls, means to guide the core to said strip of fabric, an auxiliary feed roll positioned in advance of said pair of feed rolls, means to guide said strip of fabric to said auxiliary feed and from said auxiliary feed roll to said pair of feed rolls, and means to rotate said auxiliary feed roll at a greater surface speed than that of said pair of feed rolls.

3. A tire bead covering machine having, in combination, means for feeding a strip of fabric and a core of rubber compound superimposed thereon comprising a pair of feed rolls, means to guide the core to said strip of fabric, an auxiliary feed roll positioned in advance of said pair of feed rolls, a plane tangent to the bottom of said auxiliary feed roll being lower than a plane tangent to said pair of feed rolls, means to guide said strip of fabric to said auxiliary feed roll, and means to rotate said auxiliary feed roll at a greater surface speed than that of said pair of feed rolls.

4. A tire bead covering machine having, in combination, means for feeding a strip of fabric and a core of rubber compound superimposed thereon comprising a pair of feed rolls, means to guide the core to said strip of fabric, an auxiliary feed roll positioned in advance of said pair of feed rolls, means to guide said strip of fabric downwardly beneath said auxiliary feed roll and upwardly therefrom to said pair of feed rolls, and means to rotate said auxiliary feed roll at a greater surface speed than that of said pair of feed rolls.

5. A tire bead covering machine having, in combination, means for feeding a strip of fabric and a core of rubber compound superimposed thereon comprising a pair of feed rolls, means to guide the core to said strip of fabric, an auxiliary feed roll positioned in advance of said pair of feed rolls, a guide roll interposed between the auxiliary feed roll and the pair of feed rolls, and another guide roll positioned in advance of the auxiliary feed roll, said guide rolls being positioned above the auxiliary feed roll, and means to rotate said auxiliary feed roll at a greater surface speed than that of said pair of feed rolls.

In testimony whereof I have hereunto set my hand.

FRED D. FOWLER.